United States Patent [19]

Levine

[11] Patent Number: 4,758,355

[45] Date of Patent: Jul. 19, 1988

[54] OIL SPILL RECOVERY METHOD

[75] Inventor: Robert A. Levine, Westminster, Calif.

[73] Assignee: Atlantic Richfield Company, Los Angeles, Calif.

[21] Appl. No.: 5

[22] Filed: Jan. 2, 1987

[51] Int. Cl.[4] .............................................. B01D 21/00
[52] U.S. Cl. .................................... 210/747; 210/923; 210/805; 37/54; 37/78; 405/128; 405/263; 366/345
[58] Field of Search ...................... 210/242.3, 170, 923, 210/922, 773, 747, 805, 703, 766; 37/75, 78, 70, 76, 54; 405/73, 74, 128, 263, 267, 269; 366/345

[56] References Cited

U.S. PATENT DOCUMENTS

| | | | |
|---|---|---|---|
| 324,479 | 8/1885 | O'Donnell | 37/76 |
| 2,606,375 | 8/1952 | Braun et al. | 37/75 |
| 3,962,083 | 8/1976 | Goldman | 210/923 |
| 3,999,312 | 12/1976 | Yamaguchi et al. | 37/78 |
| 4,214,988 | 7/1980 | Naffziger | 210/170 |
| 4,268,398 | 5/1981 | Shuck et al. | 210/170 |
| 4,302,339 | 11/1981 | Clontier | 210/923 |
| 4,491,368 | 1/1985 | Vittenbogaard | 37/78 |

Primary Examiner—Peter Hruskoci
Assistant Examiner—Coreen Y. Lee
Attorney, Agent, or Firm—Michael E. Martin

[57] ABSTRACT

Crude oils and other oleaginous substances which have washed onto and soaked thoroughly into coarse bottom sediments such as sand beaches and sediments forming the bottom of certain holding ponds may be released for recovery by mechanical or hydraulic plowing of the relatively loose sediments followed by hydraulic agitation of the sediments to permit the substances to float to the surface of the body of water. Shallow water beach areas may be plowed by a conventional crawler tractor having an array of ripper teeth fitted with hydraulic jet nozzles for severely agitating the sands which are plowed by the ripper teeth. A submersible pump or pump intake is preferably supported spaced from the normal path of the tractor and in the body of water to collect relatively clean water for discharge through the nozzles. A nozzle array may be mounted on a manifold supported from a floating vessel for vertical and angular adjustment relative to the bottom sediments utilizing the body of water as a source of hydraulic plowing and agitating fluid. An array of nozzles may include an angled nozzle having a generally planar jet pattern which acts to cut or plow the sand ahead of a full conical jet nozzle which thoroughly agitates the plowed or turned over sand to free the oil.

3 Claims, 2 Drawing Sheets

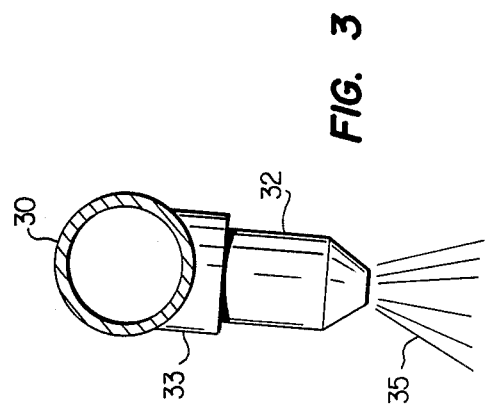
FIG. 3
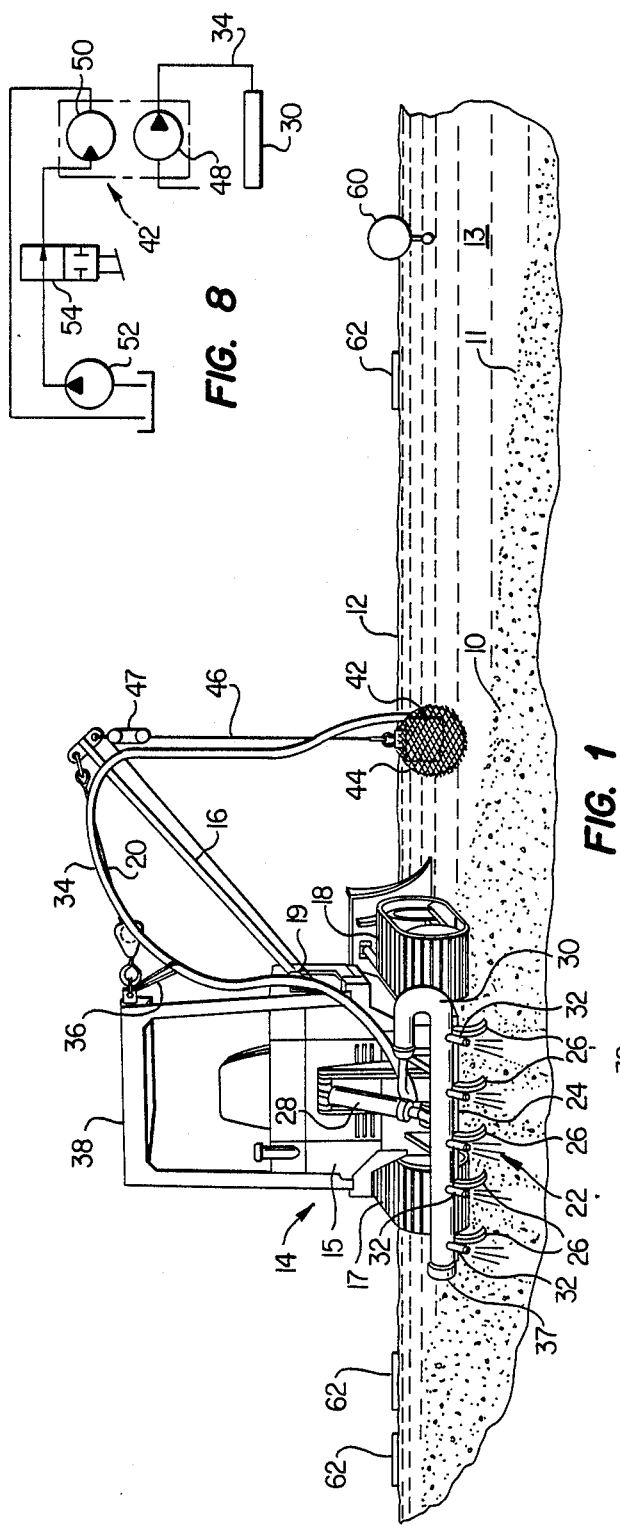
FIG. 8
FIG. 1
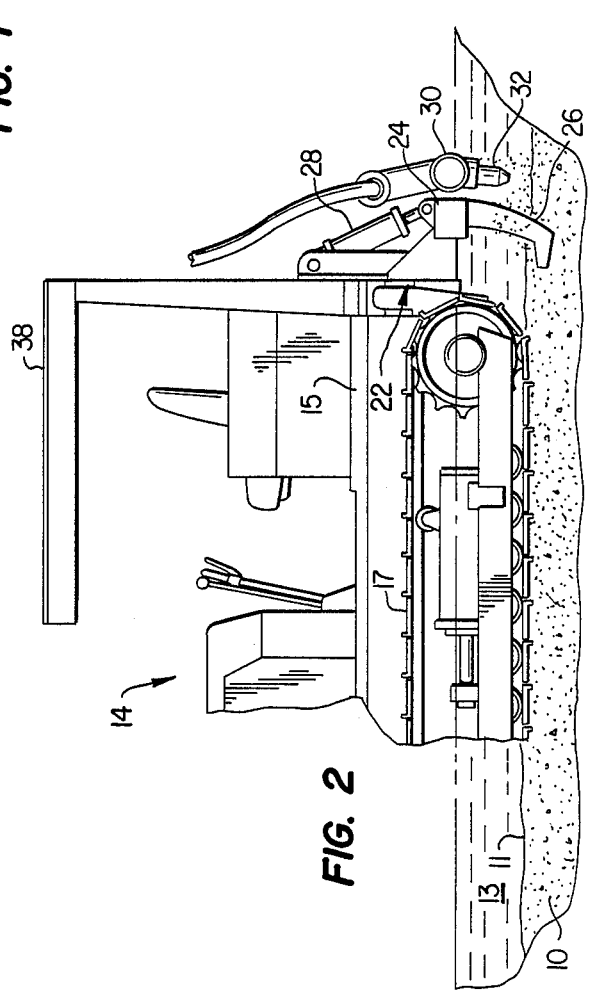
FIG. 2

OIL SPILL RECOVERY METHOD

BACKGROUND OF THE INVENTION

1. Field of the Invention

The present invention pertains to a method and apparatus for recovering crude oil and similar oily substances from oil soaked beach sands and other earth materials by a combined mechanical and hydraulic agitation process.

2. Background

It has been observed that heavy concentrations of hydrocarbon materials such as crude oils and refined oily wastes associated with oil spills and discharges into collection pits results in substantial penetration or percolation of the oil into sandy or other granular soil surfaces. In attempting to recover spilled oil from marine oil spills, it has been discovered that along shore lines having relatively coarse bottom sediments, crude oil washed onto the shore will penetrate into the sediments forming the shoreline and the sea bottom in shallow waters. The penetration of oil into a relatively wide area is aggravated in tidal waters if the oil cannot be quickly recovered by conventional surface recovery techniques. This penetration of oil into the earth's surface not only reduces the amount of oil recovered, and may be environmentally damaging, but prevents the complete removal of the oil after a spill or when the eradication of dumping pits or holding ponds for oily wastes and the like is required. Moreover, the complete removal of the oil soaked sediments or sand for processing at a remote site to remove the entrapped oil is very impractical or even impossible if large quantities of oil are washed ashore or soak into the sediments.

SUMMARY OF THE INVENTION

Notwithstanding the seemingly impossible task of freeing absorbed quantities of crude oil and other oily substances from coarse sediments such as relatively coarse beach sands and marine shorelines, the present invention has resulted in the discovery that by combined mechanical and hydraulic agitation, of multistage hydraulic agitation, of the bottom sediment that oleaginous substances such as crude oil, petroleum products and other oily wastes may be freed from entrapment in such sediments and floated to the surface of a body of water covering the sediments for removal by conventional recovery methods.

The present invention contemplates a method of recovering crude oil and other oleaginous substances from entrapment or absorbtion into relatively coarse bottom sediments along seashores and oil dumping or containment pits wherein a body of water covering the oil-soaked sediments is utilized as a source of hydraulic agitation which may penetrate the sediment to a sufficient depth to free the entrapped oil from the sediment particles whereby the oil will normally migrate to the surface of the body of water for recovery by absorbtion, adsorption or mechanical skimming techniques.

In accordance with the present invention there is also provided an improved apparatus for recovering crude oil and the like from entrapment in coarse beach sands and other relatively coarse sediment beds utilizing mechanical agitation means and hydraulic agitation and cleansing action to free the entrapped oil fluids from the sediments. One embodiment of the present invention utilizes a conventional terrain traversing vehicle such as a crawler tractor having mechanical ripping or agitating teeth which are arranged in combination with a plurality of hydraulic nozzles to severely stir and agitate beach sands and other coarse earth sediments to free entrapped oil for flotation to the surface of a body of water normally covering the sediments. In another embodiment of the invention, a marine vessel is provided which is equipped with an array of hydraulic jet nozzles which may be disposed directly above the sea bottom for severe agitation of the sand or sediment to a depth sufficient to free entrapped oil. In both embodiments of the invention, the source of hydraulic jetting fluid is preferably the body of water covering the oil soaked sediments.

Moreover, in one embodiment of the invention, a unique arrangement of nozzles is provided which cut or plow the bottom sediment followed by severe agitation of the sediment material by a second set of nozzles.

Those skilled in the art will recognize the above described features and advantages of the present invention, as well as other superior aspects thereof, upon reading the detailed description which follows in conjunction with the drawing.

BRIEF DESCRIPTION OF THE DRAWING

FIG. 1 is a perspective view of a seashore area which has been fouled with sediment absorbed crude oil and the like which is being recovered by a vehicle equipped in accordance with the method and apparatus of the present invention;

FIG. 2 is a side elevation of the vehicle shown in FIG. 1, illustrating the arrangement of the mechanical and hydraulic sediment agitating apparatus;

FIG. 3 is a detail view of one of the hydraulic jet nozzles used in conjunction with the apparatus illustrated in FIGS. 1 and 2;

FIG. 8 is a schematic diagram of a hydraulically driven water pump used in the apparatus of FIGS. 1 or 4.

DESCRIPTION OF PREFERRED EMBODIMENTS

Figure 4:
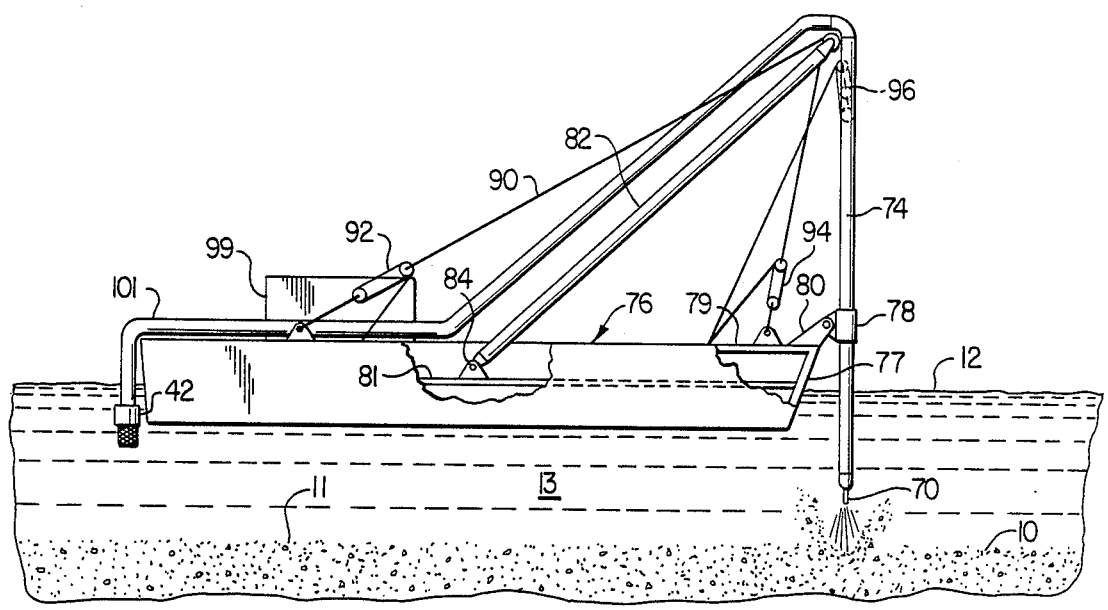
FIG. 4 is a side elevation of a marine vessel comprising a unique apparatus for agitating bottom sediments in accordance with the method of the present invention.

In the description which follows, like parts are marked throughout the specification and drawing with the same reference numerals, respectively. The drawing figures are not necessarily to scale and certain features of the invention may be shown exaggerated in scale or in somewhat schematic form in the interest of clarity and conciseness.

Referring to FIG. 1, there is illustrated one preferred method and appartus for recovering crude oil and the like which has become deposited on and absorbed into a coarse sediment such as a sand beach, generally designated by the numeral 10. The beach sediment or sand 10 is shown covered with a body of water 13 having a surface 12 and which body may be tidal or nontidal. In the instance where the water 13 recedes and then again covers the sand 10, in particular, a relatively large amount of oil from a marine oil spill or the like may absorb or percolate into the sand. This absorption of oil from a marine spill or other source may be aggravated in tidal areas wherein the total thickness of the liquid on the sand surface upon ebbing of the water will permit the oil to more thoroughly absorb into the sand. Recent incidents of marine oil spills have indicated that a substantial quantity of oil may absorb or percolate into a course sediment such as the sand 10 and, upon removal of free floating oil from the water surface 12, oil will reappear upon completion of every tidal cycle or in response to heavy wave action. It has been discovered that in connection with some oil spills that crude oil, for example, will soak or absorb into a coarse sediment surface such as the sand 10 to depths of from six to twelve inches and remain substantially entrapped in the sediment material. The shoreline of the Juan de Fuca Strait near Port Angeles, Wash., is exemplary of the type of sediments which may be freed of up to 70% of entrapped oil by the method and apparatus of the present invention.

FIG. 1 illustrates an improved apparatus for dislodging the entrapped or absorbed oil in the sand 10 comprising a terrain traversing vehicle such as a conventional crawler tractor 14. The crawler tractor 14 includes a boom 16 mounted on one side thereof for pivotal movement laterally away from the direction of movement provided by spaced apart crawler tracks 17 and 18. The boom 16 may be part of a conventional pipe laying apparatus used on crawler tractors and similar equipment. The boom 16 is pivotally connected to the tractor frame at 19 and may be raised or lowered by a hoist cable 20 suitably connected to a winch or the like, not shown. The crawler tractor 14 is also equipped with a conventional earth ripper device, generally designated by the numeral 22, see FIG. 2 also, including an elongated transversely extending bar 24 on which is mounted plow means comprising a plurality of spaced apart depending ripper teeth 26. The bar 24 is mounted for substantially vertical movement on the frame 15 of the tractor 14 by a conventional hydraulic cylinder type actuator 28.

In order to thoroughly agitate the oil soaked beach sand 10 to release entrapped oil, the tractor 14 has been modified to provide a manifold 30 extending generally parallel to the ripper tooth support bar 24 and mounted thereon for movement with the ripper teeth 26 with respect to the frame 15. The manifold 30 includes a plurality of spaced apart hydraulic jet nozzles 32 which extend normal to the longitudinal axis of the manifold and are preferably spaced such that a nozzle 32 is generally aligned with each of the ripper teeth 26 and points generally downwardly toward the surface 11 of the sand 10. The manifold 30 is connected to a flexible hose 34 which is trained through a sling 36 attached to a tractor roll-bar frame 38 along the same lateral side of the tractor 14 as is mounted the boom 16. The boom 16 supports a hydraulic motor driven pump unit, generally designated by the numeral 42, which is submerged below the surface of the water 12 and is connected to the hose 34 for delivering a relatively high pressure, high volume stream of water to the manifold 30. A protective screen or filter 44 is disposed around the pump unit 42 and the entire pump unit is supported by a flexible cable 46 depending from the boom 16. A block and tackle 47 is interposed between the boom 16 and the cable 46 for adjusting the submerged depth of the pump unit 42.

Referring briefly to FIG. 8, there is illustrated a somewhat simplified schematic of a propulsion system for operating the pump unit 42. The pump unit 42 includes a hydraulic motor driven pump 48 operably connected to a hydraulic motor 50 which is in circuit with a source of hydraulic fluid such as an engine driven pump 52 on the tractor 14. A suitable control valve 54 is interposed in the hydraulic circuit between the motor 50 and the pump 52 for controlling the speed of the motor and displacement of the pump 48. The pump 48 is adapted to receive an intake stream from the body of water 13 in which the tractor 14 is operating to free entrapped or percolated oil from the sand 10. By mounting the pump unit 42 submerged and laterally spaced from the tractor 14 on the boom 16, the source of intake water for the pump is relatively free of oil or agitated sand and thus relatively clean water is pumped to the manifold 30 for discharge through the nozzles 32.

Referring briefly to FIG. 3, one of the nozzles 32 is shown mounted to a fitting 33 which is formed as part of the manifold 30. The nozzle 32 may be of a type commercially available such as manufactured by Spraying Systems Company of Wheaton, Ill., and may be conveniently demounted from the fitting 33 for repair or replacement. The nozzle 32 is also of a type which discharges a generally conical spray pattern 35 uniformly from the distal end of the nozzle, as shown in FIGS. 1 and 3. Alternatively, it has been determined that in the exemplary nozzle arrangement of FIGS. 1 through 3 that the nozzles 32 may be replaced by 1.0 inch nominal diameter sections of pipe or tube serving as nozzles. The end of the manifold 30 opposite the end which is connected to the hose 34 may have a removable cover or plug 37 for cleaning the manifold free of any accumulated debris such as fine sand particles entrained with the jet flow stream discharged by the pump 48.

In carrying out a preferred method of recovering oil which has aborbed into the sand 10, the tractor 14 is traversed generally parallel to a shoreline of the body of water 13 over side by side paths with the ripper teeth 26 lowered to a sufficient depth below the surface 11 to plow up or agitate the sand 10 while at the same time the pump unit 42 is operated to discharge high velocity jets of water through each of the nozzles 32. As the sand 10 is mechanically agitated or "turned" by the ripper teeth 26, the jets 35 emitting from the respective nozzles 32 also thoroughly agitate the sand to free heavy oleoganeous substances from entrapment in the sand particles. In most instances, the oil will then float to the water surface 12 where it may be contained by containment boom means 60 and sorbed by conventional means, including sorbent sweeps 62 or by conventional skimming techniques, not illustrated. Thanks to supporting the pump unit 42 spaced from and laterally alongside the tractor vehicle 14, the source of water jetted through the manifold 30 will be largely free of agitated sand which can settle back to the surface 11 after being freed of oil.

Figure 5:
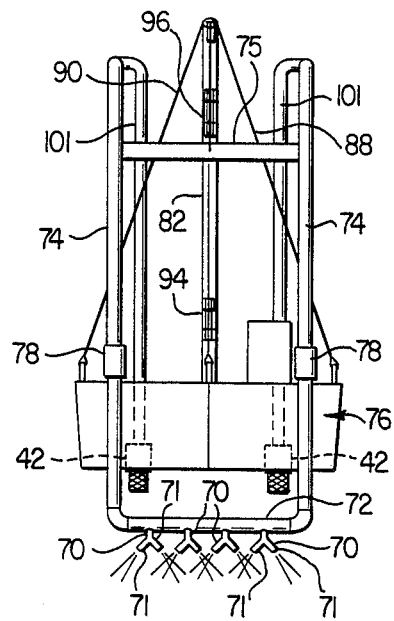
FIG. 5 is a front view of the vessel illustrated in FIG. 4.

Referring now to FIGS. 4 and 5, another embodiment of apparatus of the present invention is illustrated and characterized by an array of nozzles 70 which are mounted on a generally horizontal or laterally projecting tubular manifold 72, FIG. 5. The manifold 72 is characterized further by spaced apart vertically projecting tubular support members 74 which are supported on a floating vessel 76 by sleeve type brackets 78. The brackets 78 are pivotally connected to respective clevis members 80, one shown in FIG. 4, which are mounted on a forward bulwark portion 79 of the vessel 76. The vessel 76 may be suitably propelled by conventional marine propulsion means such as an inboard engine or an inboard outdrive, neither shown in FIGS. 4 or 5, or by winching the vessel through severely fouled waters. The manifold 72 is supported for adjustable vertical positioning with respect to the sand surface 11 and an adjustable angle of attack of the water jets emanating from the nozzles 70 by a support arrangement including a boom 82 which is mounted for pivotal movement in a vertical plane at a pivot connection 84 supported by a deck 81 on vessel 76. The boom 82 is stayed by opposed shrouds 88 and 90 which are each adjustable by suitable block and tackle means 92, one shown in FIG. 4. The boom 82 is also stayed by a third block and tackle arrangement 94 and the manifold 70 is supported for vertical adjustment relative to the boom by a fourth block and tackle arrangement 96 interconnecting the boom with a transverse support member 75.

The vessel 76 is equipped with a hydraulic fluid power supply unit 99 which includes a source of hydraulic fluid for powering respective pump units 42 which are suitably supported in the body of water 13 astern of the vessel 76. The pump units 42 are each operable to have their respective water pumps 48 in communication with the manifold 72 by way of flexible supply hoses 101 which are each suitably connected to the tubular support members 74 for charging the manifold 72 and the respective nozzles 70. As illustrated in FIG. 5, the nozzles 70 each have a somewhat inverted "Y" shaped configuration with opposed laterally angled discharge heads 71, respectively. A suitable nozzle configuration has been determined to be a fabricated pipe fitting comprising a two and one-half inch nominal diameter standard schedule 40 pipe base portion reduced to one and one-half inch diameter nozzle heads 71 extending at approximately 45° to the vertical to provide overlapping jet streams of water which may be directed generally downward in a vertical plane or angled forward of the bow 77 of the vessel 76 depending on the position of the boom 82 and the block and tackle supports 94 and 96 for the manifold 72. Accordingly, not only may the vertical position of the nozzles 70 be adjusted, but the angle and position of the nozzles with respect to the vessel 76 may also be selected according to water depth and the ability of the vessel to progress into shoal waters.

A suitable vessel of the type generally configured in accordance with the previous description and the drawing FIGS. 4 and 5 comprises a vessel having an overall length of approximately 30 feet constructed in a somewhat barge shaped configuration with an onboard internal combustion engine driven hydraulic power supply unit 99 driving two pump units discharging approximately 500 gallons per minute at 100 psig pressure to the nozzles 70. Traversal of the coarse sediments in which oil is entrapped may be carried out in the same manner as for the embodiment of the present invention illustrated in FIGS. 1 through 3. The vessel 76 may be moved forward or astern during agitation and stirring of the sand 10 and the placement of the pump units 42 avoids ingestion of severely sand or oil contaminated water.

Figure 6:
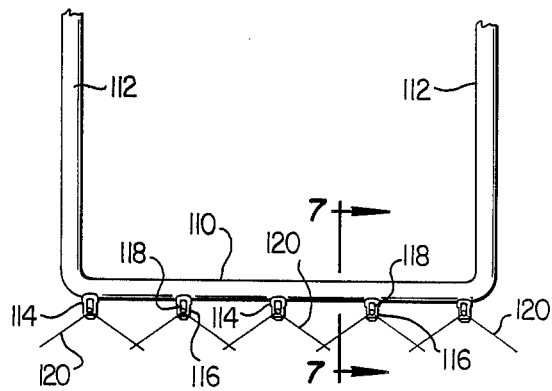
FIG. 6 is a detail view of a modification of the nozzle array for use with the apparatus illustrated in FIG. 1 or FIG. 4.
Figure 7:
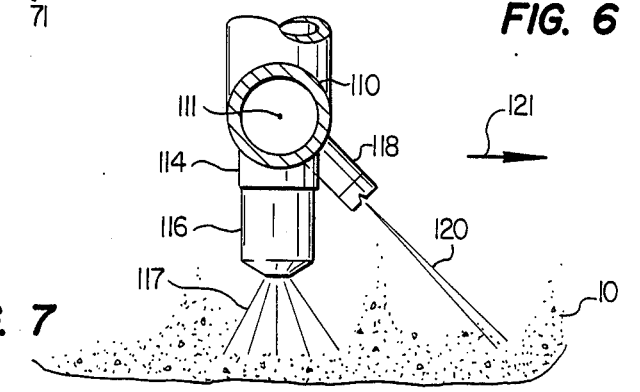
FIG. 7 is a detail view of the nozzle array of the embodiment illustrated in FIG. 6.

Referring now to FIGS. 6 and 7, an alternate embodiment of the nozzle arrangement for use with the vessel 76 or a similar vessel is illustrated and includes a tubular manifold 110 similar to the manifold 72 having spaced upright tubular support portions 112 which may be supported in the sleeve type brackets 78. The manifold 110 includes a plurality of spaced apart nozzzle assemblies 114, each including a generally downward extending nozzle head 116, FIG. 7, and an angled nozzle head 118, both in communication with the manifold 110 for receiving high pressure water therefrom. The nozzle heads 118 are of a type which discharge a somewhat planer fan-shaped jet stream 120 in a plane which may include the longitudinal axis 111 of the manifold 110. The nozzle heads 116 may be of a type which discharge a generally conical jet 117, similar to the jet pattern of the nozzle heads 32, or a straight cylindrical pipe type of nozzle. By providing a so-called "V" shaped or planar jet stream 120 at an angle ahead of the agitating and washing jet stream 117, oil soaked and may be loosened and severely agitated before the more thorough and complete agitating action of the nozzle jet streams 117 contacts the loosened and agitated sand. The direction of movement of the manifold 110 relative to the sediment bottom or sand 10 is normally as indicated by the arrow 121 in FIG. 7.

Operations to recover oil from heavily oiled sand beaches utilizing the arrangement illustrated in conjunction with drawing FIGS. 1 through 7 have been carried out using suitable containment and recovery equipment including containment booms such as the boom 60 and rows of sorbent sweeps 62 arranged at least two or three deep and extending parallel to the beach surfline. The tractor vehicles 14 preferably are moved parallel to the surfline and follow any tidal movements to maintain the ripper teeth 26 and the nozzles 32 submerged. In deeper waters, of course, the vessel 76 is typically employed to carry out the agitation and cleansing process.

Although preferred embodiments of the present invention have been described in detail herein, those skilled in the art will recognize that various substitutions and modifications may be made to the specific embodiments described without departing from the scope and spirit of the invention as recited in the appended claims.

What is claimed is:

1. A method for recovering oleaginous substances including at least one of crude oil and refined petroleum products from entrapment in a bed of coarse sediments covered by a standing body of water wherein said substances have penetrated said sediments, comprising the steps of:
   providing vehicle means for traversing an area inclusive of said sediments which are submerged under said body of water, said vehicle means including means for hydraulically agitating said sediments to release said substances for flotation to the surface of said body of water;
   traversing said vehicle over said sediments in which said substances are entrapped while plowing said bed to agitate said sediments including using jets of water from said body of water to hydraulically free said substances from said sediments; and
   removing said substances from the surface of said body of water.

2. The method set forth in claim 1 wherein:
   the step of agitating said sediments includes mechanically plowing said sediments to expose sediments below the surface of said bed and hydraulically agitating said sediments with said jets of water while plowing said sediments to release said substances from grains of said sediments for flotation to the surface of said body of water.

3. The method set forth in claim 1 wherein:
the step of agitating said sediments is carried out by hydraulically plowing said sediments with jets of water to dislodge and disperse said sediments from their normal position in said bed and hydraulically agitating said sediments with further jets of water to free said substances from grains of said sediments.

* * * * *